US012438251B1

(12) United States Patent
Lee et al.

(10) Patent No.: US 12,438,251 B1
(45) Date of Patent: Oct. 7, 2025

(54) MILLIMETER WAVE RESONATOR APPARATUSES AND METHODS

(71) Applicant: HRL Laboratories, LLC, Malibu, CA (US)

(72) Inventors: Hanseung Lee, Malibu, CA (US); Kyung-Ah Son, Malibu, CA (US); Jeong-Sun Moon, Malibu, CA (US); Ryan Quarfoth, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 213 days.

(21) Appl. No.: 18/346,151

(22) Filed: Jun. 30, 2023

(51) Int. Cl.
*H01P 7/10* (2006.01)
*H01P 7/08* (2006.01)

(52) U.S. Cl.
CPC ................ *H01P 7/10* (2013.01); *H01P 7/088* (2013.01)

(58) Field of Classification Search
CPC ...... H01P 7/00; H01P 7/10; H01P 7/08; H01P 7/088
USPC ........................... 333/219, 219.1, 219.2, 235
See application file for complete search history.

(56) References Cited

U.S. PATENT DOCUMENTS

2006/0125579 A1* 6/2006 Baleras ................. H01P 11/007 333/210
2009/0284351 A1* 11/2009 Rossman ................. H01Q 9/27 343/895
2020/0104694 A1* 4/2020 Nikonov .................. H03B 7/00

OTHER PUBLICATIONS

Crunteanu, A., et al., "Characterization and Performance Analysis of BST-Based Ferroelectric Varactors in the Millimeter-Wave Domain", Crystals, 2021, pp. 1-10.
Kalkur, T.S., et al., "Tunable and switchable resonators and filters based on ferroelectric BST thin films for wireless communications", IEEE ISAF, 2015 (4 pages).
Park, M. et al., "High-Overtone Thin Film Ferroelectric AlScN-on-Silicon Composite Resonators", IEEE Electron Device Letters, vol. 42, No. 6, Jun. 2021, pp. 911-914.
Wang, C. et al., "Dielectric resonators and filters", IEEE Microwave Magazine, Oct. 2007, pp. 115-127.

* cited by examiner

*Primary Examiner* — Rakesh B Patel
(74) *Attorney, Agent, or Firm* — Ladas & Parry, LLP

(57) ABSTRACT

Electrically tunable millimeter wave resonators and methods for fabricating and operating the same are disclosed. Embodiments include tunable millimeter wave resonators utilizing rare-earth nickelates, such as samarium nickelate. Embodiments tune the resonating member to frequencies between 30 and 100 GHz by varying the electric field across a resonating member. Further embodiments include a resonating member mounted to (and optionally embedded in) a substrate with conductive material connected to the resonating member and the substrate, and the total thickness can be 0.2 millimeters or less, or 0.1 millimeters or less. Additional embodiments include resonating members with a maximum dimension of 0.3 millimeters. Some embodiments include a gap between the conductive material contacting the substrate and the conductive material contacting the resonating member. Additional embodiments include resonating members with a loss tangent of less than 0.001, a dielectric constant of at least 100, and/or a quality factor greater than 500.

18 Claims, 9 Drawing Sheets

MILLIMETER WAVE RESONATOR APPARATUSES AND METHODS

FIELD

Embodiments of the present disclosure relate generally to resonators, and particular embodiments relate to radio frequency (RF) resonators, for example, millimeter wave resonators.

BACKGROUND

Resonators are used for generating radio waves, filtering radio waves, and receiving radio waves. However, it was realized by the inventors of the current disclosure that problems exist with at least the size and tunability of current resonators and that improvements in resonators, such as resonators operating in the millimeter wave region, are needed.

Certain preferred features of the present disclosure address these and other needs and provide other important advantages.

SUMMARY

Embodiments of the present disclosure provide improved millimeter wave resonator apparatuses and methods.

Further embodiments include resonators, resonating members, and/or resonator material based on rare-earth materials, for example, rare-earth nickelate, such as samarium nickelate ($SmNiO_3$, also referred to as "SNO").

Embodiments of the present disclosure include mm-wave resonators and/or resonating members utilizing rare-earth materials, such as SNO.

Additional embodiments include tunable millimeter wave resonators.

Still further embodiments include devices for implementing resonators in larger systems and mechanisms, such as transmitters, filters and/or antennae.

Embodiments of the present disclosure include resonators and/or resonating members with certain geometries, orientations and characteristics that exhibit low loss, are of compact size, and/or are frequency tunable.

In accordance with aspects of embodiments of the present disclosure, a tunable millimeter wave resonator is disclosed. Embodiments of the resonator include: a resonating member consisting essentially of a rare-earth nickelate and defining a first side and a second side; a first electrode contacting the first side of the resonating member; and a second electrode contacting the second side of the resonating member; wherein a resonant frequency of the resonating member is changed when the electric potential between the first and second electrodes is changed. Additional embodiments further and optionally include: a resonator wherein the rare-earth nickelate is samarium nickelate (SmNiO3); a substrate defining a first side and a second side; a first conductive trace on the first side of the substrate; a second conductive trace on the second side of the substrate; the first conductive trace being in electrical communication with the first electrode; the first conductive trace physically contacting the first electrode; the first conductive trace and the first electrode are configured to define a gap between the first conductive trace and the first electrode; an overall thickness of the resonating member, the first electrode, the second electrode, the substrate, the first conductive trace and the second conductive trace when connected together being at most 0.20 millimeters; an overall thickness of the resonating member, the first electrode, the second electrode, the substrate, the first conductive trace and the second conductive trace when connected together being at most 0.10 millimeters; the diameter of the resonating member is at most 1 millimeter; the second conductive trace forms the second electrode contacting the second side of the resonating member; the resonating member is embedded in the substrate; the first side of the resonating member is coplanar with the first side of the substrate; the second side of the resonating member is coplanar with the second side of the substrate; varying the electric potential between the first and second electrodes varies the resonant frequency between 30 GHZ and 100 GHz inclusive; the loss tangent (tan δ) of the rare-earth nickelate is less than 0.001; the dielectric constant ($\varepsilon_r$) of the rare-earth nickelate is at least 100; and/or the quality (Q) factor of the rare-earth nickelate is greater than 500. Still further embodiments include one or more transmitters, filters and/or antennae including one or more tunable millimeter wave resonators described above.

In accordance with additional aspects of embodiments of the present disclosure, a method of operating a tunable millimeter wave resonator is disclosed. The method includes: applying a voltage across first and second sides of a resonating member consisting essentially of a rare-earth nickelate; generating a first resonance frequency of at least 30 GHz with the resonating member by said applying a voltage; varying the voltage applied across the first and second sides of the resonating member; and varying the resonance frequency of the resonating member to a second resonance frequency of at least 30 GHz by said varying the voltage, wherein the second resonance frequency is different from the first resonance frequency. Additional embodiments further and optionally include: the rare-earth nickelate being samarium nickelate (SmNiO3); the first resonance frequency being at most 80 GHz; the second resonance frequency being at most 80 GHZ; a first electrode being connected to the first side of the resonating member; a second electrode being connected to the second side of the resonating member; electrically communicating a voltage between the first electrode and the second electrode; electrically communicating a voltage between the first electrode and the second electrode using a capacitive coupling for electrically communicating with the first electrode; and/or electrically communicating a voltage between the first electrode and the second electrode using an inductive coupling for electrically communicating with the second electrode.

In accordance with further aspects of embodiments of the present disclosure, a millimeter wave resonator is disclosed. Embodiments of the resonator include: a substrate defining a first side and a second side; a resonating member defining a first side and a second side, wherein the first side of the resonating member is coplanar with the first side of the substrate, and wherein the second side of the resonating member is coplanar with the second side of the substrate; a first electrically conductive material mounted to the first side of the substrate and the first side of the resonating member; and a second electrically conductive material mounted to the second side of the substrate and the second side of the resonating member. Additional embodiments further and optionally include: the resonant frequency of the resonating member being changed when the electric potential between the first electrically conductive material and the second electrically conductive material changed.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1A:
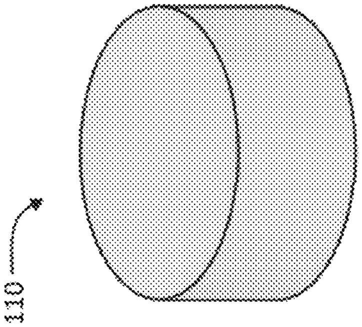
FIG. 1A is a perspective view of a resonating member according to at least one embodiment of the present disclosure.
Figure 1B:
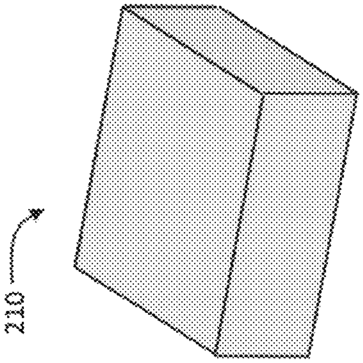
FIG. 1B is a perspective view of a resonating member according to at least another embodiment of the present disclosure.
Figure 1C:
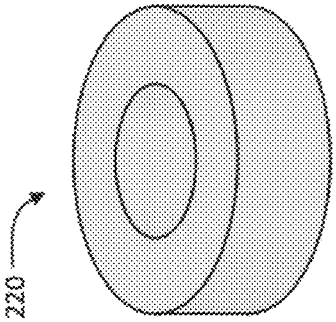
FIG. 1C is a perspective view of a resonating member according to at least a further embodiment of the present disclosure.
Figure 1D:
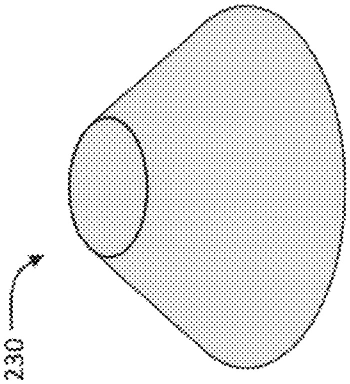
FIG. 1D is a perspective view of a resonating member according to at least an additional embodiment of the present disclosure.
Figure 1E:
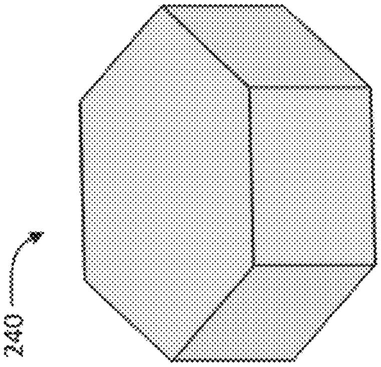
FIG. 1E is a perspective view of a resonating member according to at least a further embodiment of the present disclosure.
Figure 1F:
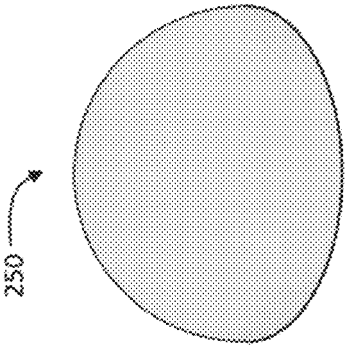
FIG. 1F is a perspective view of a resonating member according to at least another embodiment of the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" that may occur within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure include resonators and resonating members that are manufactured using rare-earth nickelates, such as correlated perovskite (rare-earth transition metal) nickelates. Example rare-earth nickelates used in embodiments of the present disclosure include, for example, samarium nickelate ($SmNiO_3$, also referred to herein as "SNO"), PrNiO3, NdNiO3 and GdNiO3. Manufacturing resonators and resonating members using rare-earth nickelates can exhibit certain benefits over existing resonators such as reduced size (for example, resonators and/or resonating members that are 10 fold reduced in volume compared to traditional dielectric resonators when considering the 10 times larger dielectric constant of rare-earth nickelates in contrast to traditional dielectric resonators), low loss (also referred to as low damping), the ability to tune a single resonator and/or resonating member (either with a single, fixed size) to different frequencies, and/or the ability to resonate (and be tuned) in millimeter range wavelengths, which are typically between 1 millimeter (approximately 300 GHZ) and 10 millimeters (approximately 30 GHZ).

Rare-earth nickelates are traditionally difficult to fabricate and there are challenges manufacturing rare-earth nickelate resonating members, especially when manufacturing rare-earth nickelates at the thicknesses appropriate for resonating members to resonate in the mm-wave region, for example, thicknesses of 0.005 microns (5 nanometers) to 200 microns (200,000 nanometers), and in some embodiments thicknesses of 0.02 microns (20 nanometers) to 100 microns (100,000 nanometers). Example properties of rare-earth nickelate resonators and/or resonating members the inventors of the present disclosure realized would lead to advances in resonators include their very high dielectric constants ($100 \leq \varepsilon_r \leq 500$, and for some rare-earth nickelate resonator embodiments 200$\leq \varepsilon_r \leq 300$), high quality factors (Q>500), and low loss tangents (tan $\delta < 0.001$). Moreover, these advantages can combine to allow the fabrication of very compact resonators and resonating members, which can effectively operate at sizes that can be 10 times smaller in volume than existing resonators and resonating members while maintaining a high quality factor (Q) of at least 500 at millimeter-wave (mm-wave) frequencies. In at least one example embodiment the largest dimension of a resonating member is less than 0.3 millimeters (mm), and the resonating member is still able to develop mm-wave frequencies (for example, 50 GHz), and in additional embodiments the operational frequency is also tunable.

Still further, rare-earth nickelate resonators and/or resonating members according to embodiments of the present disclosure can exhibit wide, electric field controlled tunability.

Resonator and resonating member embodiments of the present disclosure exhibit a widely tunable dielectric constant, with some embodiments (for example, SNO-based embodiments) demonstrating 3:1 tuning over a range of dielectric constants (for example, $\varepsilon_r$=100 to 300). Moreover, some embodiments (for example, SNO-based embodiments) require 10 times smaller DC voltage to tune the resonator (or resonating member) embodiments when compared to resonators (or resonating members) that may be based on other material, such as those based on barium strontium titanate ($BaSrTiO_3$ or BST). The dielectric tuning of embodiments of the present disclosure, such as those incorporating SNO, provide 1.7:1 resonance frequency tuning, which can enable wideband filter banks with far fewer channels than those based on static filters, for example, 10 times fewer channels for a 9:1 filter bank.

Some embodiments provide 1.7:1 resonance frequency tuning, which results in a minimum resonant frequency that is 1.7 times smaller than the maximum resonant frequency. For example, in embodiments with a maximum resonant frequency of 85 GHZ (which occurs when there is no electric field, in other words, DC=0 Volts), the minimum resonant frequency will be 50 GHZ (85 GHz/1.7=50 GHz, which occurs at a maximum electric field). In general, smaller sized resonating members result in higher center frequencies. With the high degree of tunability of resonator and resonating member embodiments, 10 times fewer filters are required in the filter banks of these implementations, resulting in filter banks with 9:1 bandwidth coverage having 10 times less area than equivalent filter banks based on non-tunable and resonating members. For example, in filter banks with a resonance range of 10 GHz to 90 GHZ, an equivalent system utilizing non-tunable resonators would require an area 10 times larger than that of a filter bank utilizing the tunable resonators described herein in order to achieve the same resonance range.

Embodiments of the present disclosure provide high-Q and compact mm-wave resonators and resonating members, which are very well suited for wafer-scale monolithic integration into larger systems and mechanisms, such as transmitters, filters and antennae. Some embodiments of the present disclosure, such as those utilizing SNO, combine high dielectric constant with low loss, resulting in higher operating frequencies than current compact filter technologies. This is in contrast to existing dielectric resonators and resonating members, some of which may have high quality factors (Q) and may be capable of operating over a range of frequencies; however, these existing dielectric resonators will have relatively low dielectric constants (for example, $\varepsilon_r$<50) and no tunability, which leads to much larger resonators and filters in their array applications. For example, filters based on $LiNbO_3$ or AlScN appear to be inoperable at mm-wave frequencies and materials with relatively high $\varepsilon_r$ (for example, BST) have a significantly lower Q-factor than SNO materials.

Embodiment resonators of the present disclosure are manufactured by fabricating electrodes and radio frequency (RF) coupling lines directly onto the resonating member, which further allows for a compact size and a highly repeatable wafer fabrication process that is scalable to wideband filter banks. Example resonator and resonating member embodiments of the present disclosure may be fabricated utilizing high-quality crystalline film growth of a correlated oxide (for example, SNO) that is sputtered on substrates such as silicon (Si), thin metal films, and substrates used in the fabrication of printed circuit boards (PCBs).

Embodiments of the present disclosure may be used in wide-band tunable resonators and/or filters for various types of RF modules, such as mm-wave beamforming arrays or for preventing saturation of receivers by incoming electronic signals. Embodiment resonators and resonating members may also be implemented in wireless systems such as wireless communication systems (for example, cellular, GPS, WiFi and V2X) that are installed in vehicular or handheld systems.

FIG. 1 (FIGS. 1A-1F) depicts different example shapes of rare-earth resonating members according to embodiments of the present disclosure. FIG. 1A depicts an example resonating member 110 with a cylindrical shape, which is a commonly used shape according to embodiments of the present disclosure. FIG. 1B depicts an example resonating member 210 with a cuboid shape. FIG. 1C depicts an example resonating member with an aperture creating a toroid shape, such as the depicted toroid 220, which is formed by revolving a rectangle and/or square around an axis. FIG. 1D depicts an example resonating member 230 in the shape of a truncated cone. FIG. 1E depicts an example resonating member 240 with a hexagonal prism shape. FIG. 1F depicts an example resonating member with a curved dome shape, which in some embodiments such as the depicted embodiment 250 is hemispherically shaped, although in other embodiments the curved outer surface may be elliptical, parabolic or hyperbolic. Still further example resonating members include resonating members 210, 230, 240 and 250 with apertures similar to the aperture of resonating member 220, although in addition to the aperture in these embodiments being circular, the aperture may reflect the shape of the outer surface of the resonating member, for example, the aperture may be rectangular, square, conic, hexagonal or hemispherical. Moreover, while some of the disclosed shapes could potentially have similarities with current resonating members implemented with lower dielectric constant ($\varepsilon_r$<50), the sizes of the resonating members depicted in FIGS. 1A-1F are substantially smaller (approximately 10 times smaller in volume when considering the 10 times smaller dielectric constant) than current resonating members implemented with lower dielectric constant ($\varepsilon_r$<50).

Figure 2:
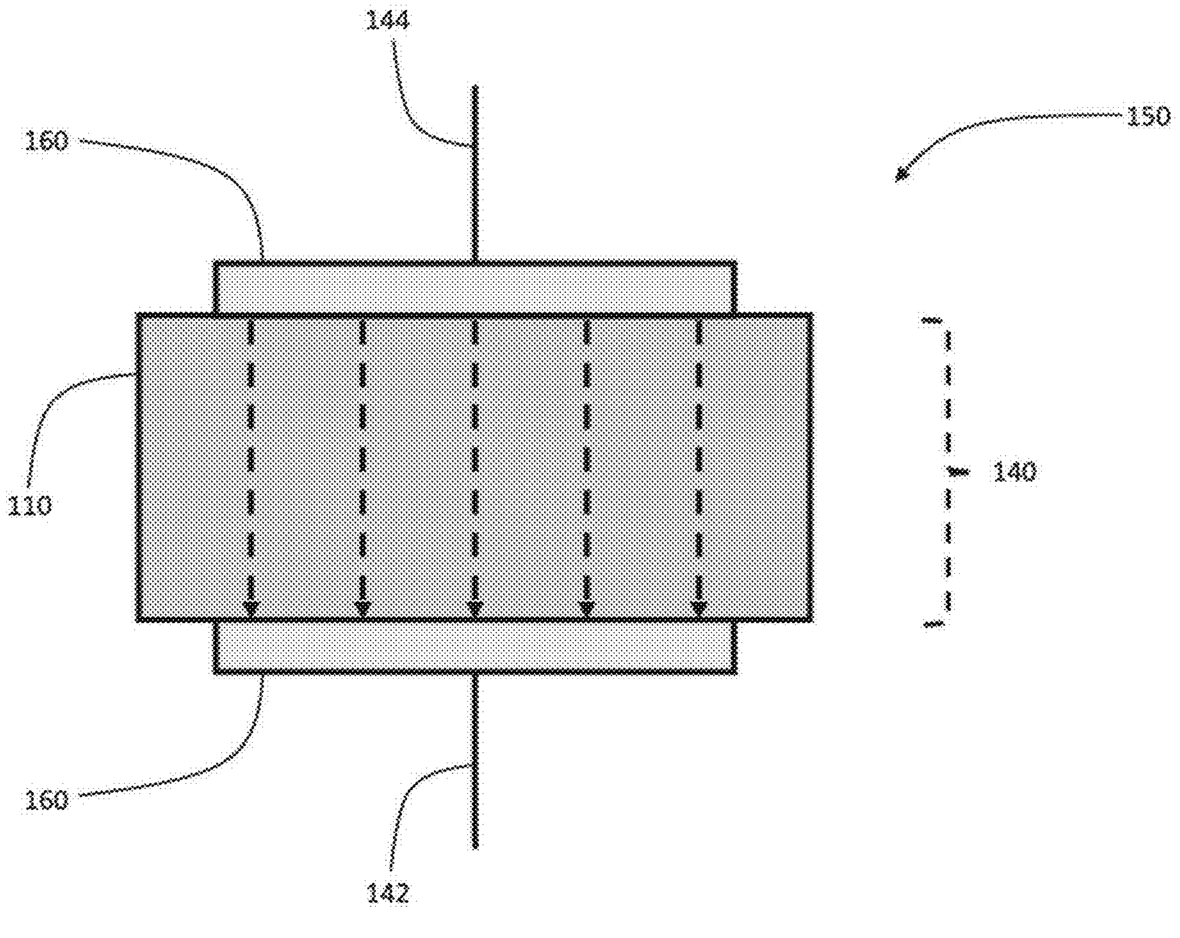
FIG. 2 is a sectional view of an electric field being applied to a resonating member according to embodiments of the present disclosure.

Tuning of the resonating member's resonant frequency is achieved by changing the electric field in which the resonating member is located. For example, embodiments of the present disclosure include two electrodes positioned on different sides of the resonating member (for example, positioned on opposite sides of the resonating member) and applying an electric potential difference between the two electrodes. The difference in electric potential between the two electrodes induces an electric field between the two electrodes, thereby applying an electric field to the resonating member. An example of the application of an electric field to a resonating member according to embodiments of the present disclosure is depicted in FIG. 2. In FIG. 2, resonator 150 includes resonating member 110 and two electrodes 160. A higher voltage (electric potential) 144 is applied to one of the electrodes 160 (the upper electrode 160 depicted in FIG. 2) and a lower voltage (electric potential) 142 is applied to the other electrode 160 (the lower electrode 160 depicted in FIG. 2). An electric field is formed between the two electrodes 160, and a portion of the electric field being applied to the resonator 150 is depicted as electric field 140 (see, the dashed arrows) in FIG. 2.

The electric field dielectric tunability of rare-earth nickelate material (for example, SNO) is believed to result from the ionic nature of the Ni—O bonds in the NiO6 octahedra and the charge ordering in the rare-earth nickelate (for example, SNO). The strong correlation of electrons in the rare-earth nickelate results in the movement of one carrier being critically dependent on the movements of all the others, minimizing space charges in the rare-earth nickelate. This can keep the dielectric loss of the rare-earth nickelate very low (for example, tan δ~0.001) while at the same time providing a high dielectric tunability (on the order of 3:1) when applying an electric field.

Figure 3:
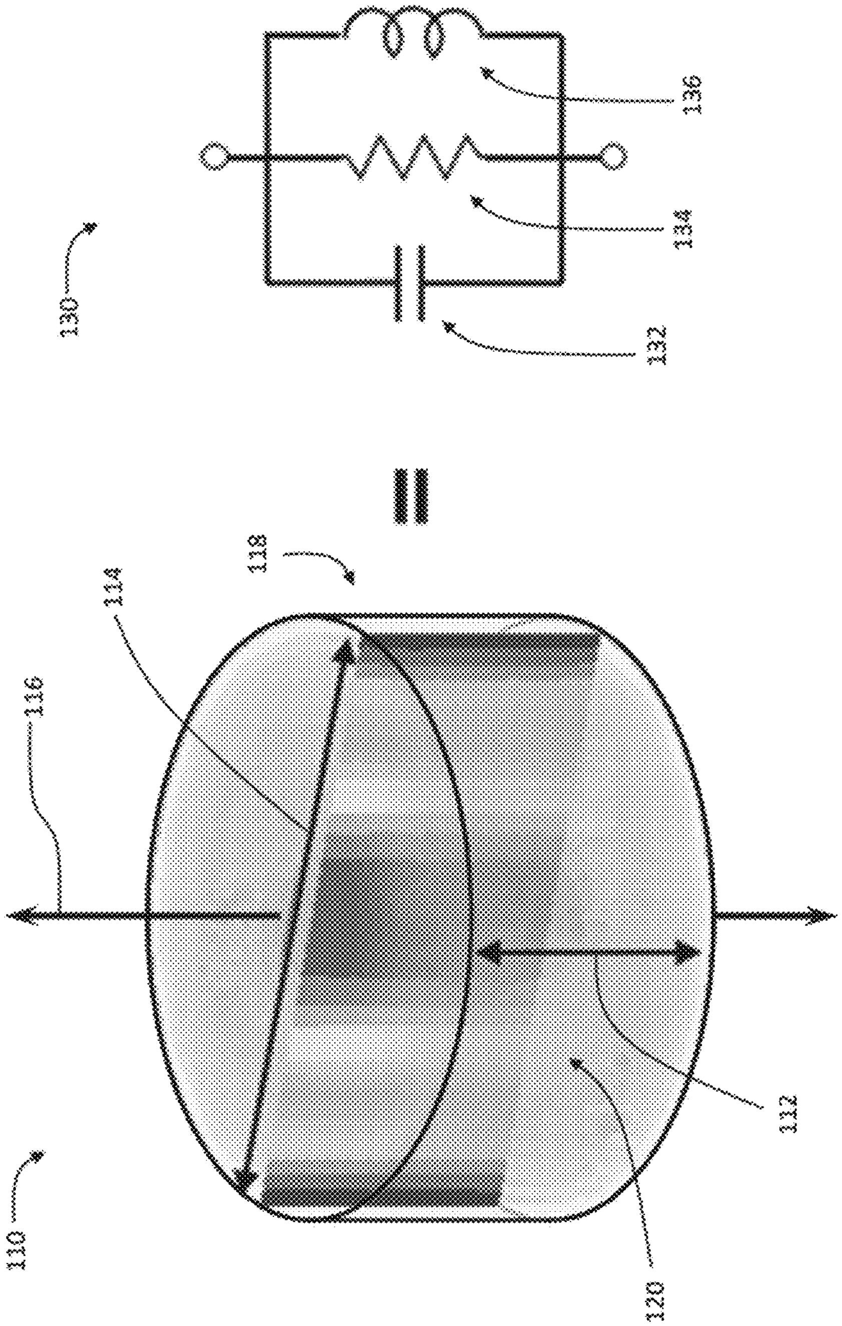
FIG. 3 is a perspective view of an example electric field distribution in the resonating member depicted in FIG. 1A and an equivalent corresponding electric circuit.

Depicted in FIG. 3 is an example idealized electric field distribution that has been induced in resonating member 110 (for example, an SNO based resonating member 110) assuming an ideal/perfect electric conductor (PEC) boundary condition. Also shown in FIG. 3 is an idealized circuit model of the resonating member 110. Resonating member 110 defines a height 112, a diameter 114, a central axis 116, and an outer perimeter surface 118. The electric field 120 is within the resonating member 110 with the field intensity being greater near the central axis 116 and less near the outer perimeter surface 118. The direction of the electric field 120 aligns with the axis 116. The equivalent circuit 130 includes a capacitor 132 (which may be referred to as $C_0$), a resistor 134 (which may be referred to as $R_0$), and an inductor 136 (which may be referred to as $L_0$) connected in parallel. In the depicted embodiment, the height 112 (which may also be referred to as the thickness of the resonating member 110) is 0.1 millimeters and the diameter 114 is 0.29 millimeters.

Embodiments of the present disclosure (for example, those utilizing SNO) include resonators and resonating members with one or more (including all) of the following characteristics: high dielectric constant (for example, 200<$\varepsilon_r$<500) when resonating in the mm-wave region (for example, between 30 and 300 GHZ); low loss (for example, tan δ~0.001) at mm-wave frequencies; high Q (for example, Q>500 for center frequencies ($f_0$) of approximately 50 GHz); high-quality (for example, stoichiometric (for example, atomic ratio of Sm:Ni:O in SmNiO3~1:1:3) with very low defect density (for example, oxygen deficiency); low mechanical stress resulting from the resonator material growth on the substrate (such as a low mechanical stress caused by a lattice mismatch of 5% or less (2% or less in some embodiments) between the resonator film (for example, SNO) and the substrate), which would assist in preventing cracks, deformation and/or delamination of the resonator and/or substrate films); thick (at least a few tens of microns) resonator material growth on the substrate; and/or high-tunability of the dielectric constant, for example, the resonating member is tunable between 1 GHz (gigahertz) and 300 GHz inclusive, while in additional embodiments the resonating member is tunable between 30 GHz and 100 GHz inclusive, while in still additional embodiments the resonating member is tunable between 40 GHz and 80 GHz inclusive. Example embodiments of the present disclosure include substrates comprising, consisting essential of, or consisting of: Si(100); LaAlO3 (LAO); SrLaAlO3 (SLAO); SrTiO3 (STO); and Al2O3 (sapphire).

Figure 4:
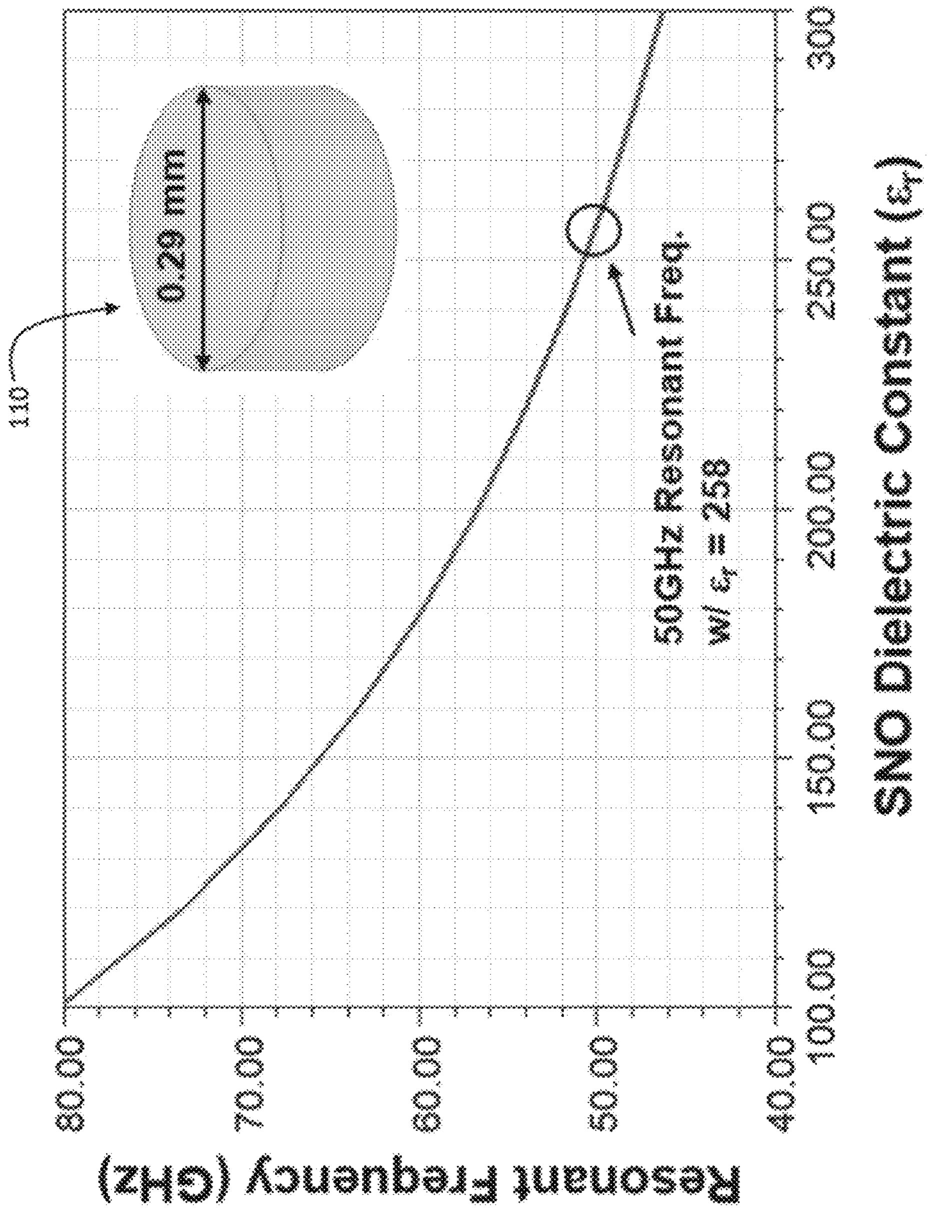
FIG. 4 is a graphical depiction of the resonant frequency of an ideal resonating member with dielectric constant tuning according to at least one embodiment of the present disclosure.

The resonant frequency of embodiments of the present disclosure (for example, an SNO-based resonating member 110) vary mainly with the diameter and the dielectric constant of the resonating member 110. The thickness of the resonating member 110 does not affect the resonant frequency to the same extent as the diameter of the resonating member 110. Depicted in FIG. 4 is a plot of the idealized resonant frequency of an SNO-based resonating member 110 utilizing SNO with a 0.29 mm diameter. In FIG. 4 the resonating member 110 achieves a 50 GHz resonant frequency when the electric field is adjusted to produce a dielectric constant ($\varepsilon_r$) of 258. Here, the Q-factor is 1000 and the loss tangent (tan δ) is 0.001. FIG. 4 also shows that when the electric potential applied to resonating member 110 induces a dielectric constant of approximately 100 the resulting resonant frequency is approximately 80 GHZ, and when the applied electric potential induces a dielectric constant of approximately 300 the resulting resonant frequency is approximately 46 GHZ. The higher dielectric constants for SNO-based resonating member 110 allows embodiments of the present disclosure to be substantially smaller than typical resonators and resonating members.

Varying the diameter of the resonating member also affects the resonant frequency. Table 1 includes example diameters of resonating member 110 and the SNO dielectric constants required to achieve a 50 GHz resonant frequency. SNO resonating members according to embodiments of the present disclosure with less than a 0.3 mm diameter provide a 50 GHz center frequency and a Q-factor of 1000. In some embodiments the diameter of the resonator is from 0.1 mm (100 microns) to 10 mm (10,000 microns), while in additional embodiments the diameter of the resonator is from 0.1 mm (100 microns) to 1 mm (1,000 microns).

TABLE 1

| Resonating member 110 Diameter (mm) with 0.1 mm thickness | Dielectric Constant ($\varepsilon_r$) for 50 GHz Resonance |
|---|---|
| 0.24 | 376 |
| 0.26 | 320 |
| 0.28 | 276 |

Still further, the strong dipole interactions exhibited in rare-earth nickelates such as SNO result in resonating member embodiments having highly sensitive responses to varying electric fields. In these embodiments the dielectric constant can be tuned 3:1 (as measured by the DC voltage potential applied to the resonating member, for example, an SNO-metal resonator), which results in 1.7:1 resonant frequency tuning in the mm-wave range. Here it is estimated that the resonant frequency tuning is approximately $\sqrt{\varepsilon_H/\varepsilon_L}$:1, where $\varepsilon_H$ and $\varepsilon_L$ are highest and lowest dielectric constant, respectively.

Figure 5:
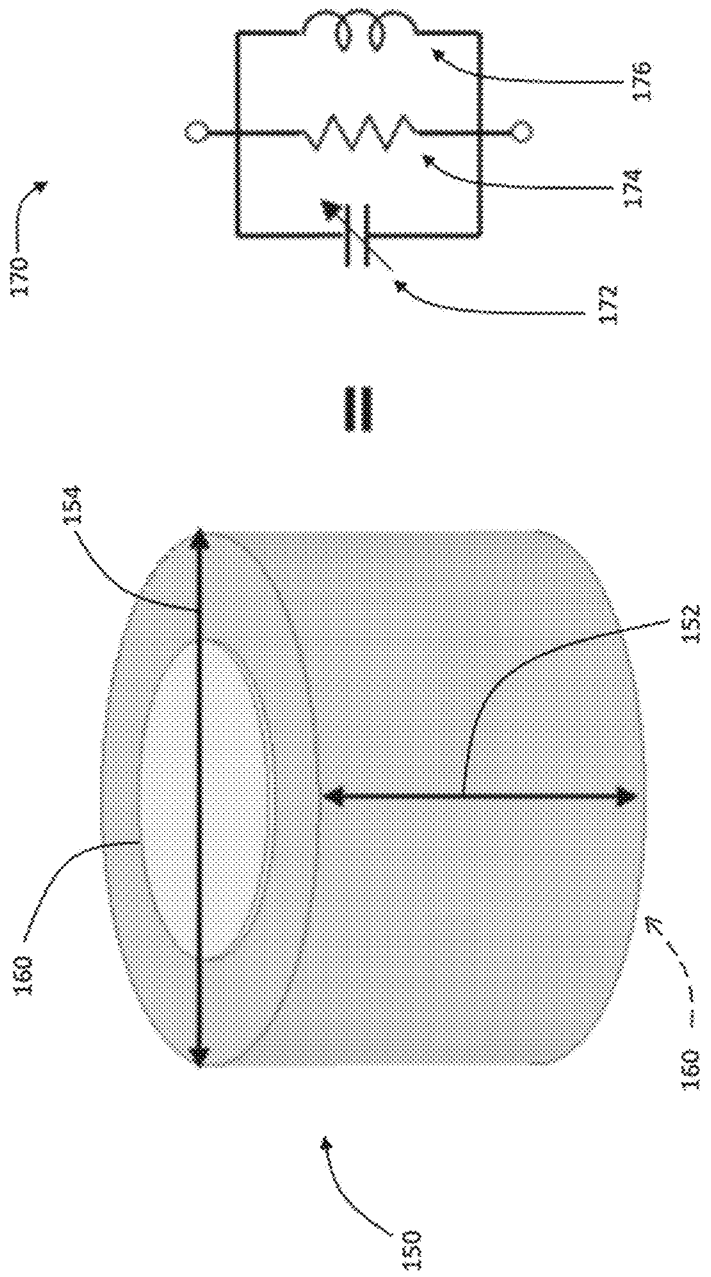
FIG. 5 is a perspective view of a tunable resonator with a resonating member, electrodes and an equivalent electrical circuit according to embodiments of the present disclosure.

Depicted in FIG. 5 is an example tunable resonator 150 according to an example embodiment of the present disclosure. Resonator 150 defines a height 152 and a diameter 154. An electrode 160 contacts the upper surface of resonator 150 and a similar electrode 160 contacts the bottom surface of resonator 150. The equivalent circuit 170 to resonator 150 includes a variable capacitor 172 (which may be referred to as $C_0$), a resistor 174 (which may be referred to as $R_0$), and an inductor 176 (which may be referred to as $L_0$) connected in parallel. In the depicted example embodiment the height 152 is 0.29 millimeters and the diameter 114 is also 0.29 millimeters. When fabricated utilizing SNO as an example, resonator 150 is capable of operating at a center 50 GHz frequency, and the resonant frequency may be varied within a range of frequencies around 50 GHz depending on the electric potential applied between electrodes 160. While in some embodiments the diameter 154 of the resonator 150 is 0.29 mm, other embodiments utilize different radii depending on the target operation frequency. While the geometry of electrodes 160 is circular, other embodiments utilize electrodes 160 with different shapes, such as electrodes that are square, rectangular, triangular, and circular with hole.

Figure 6:
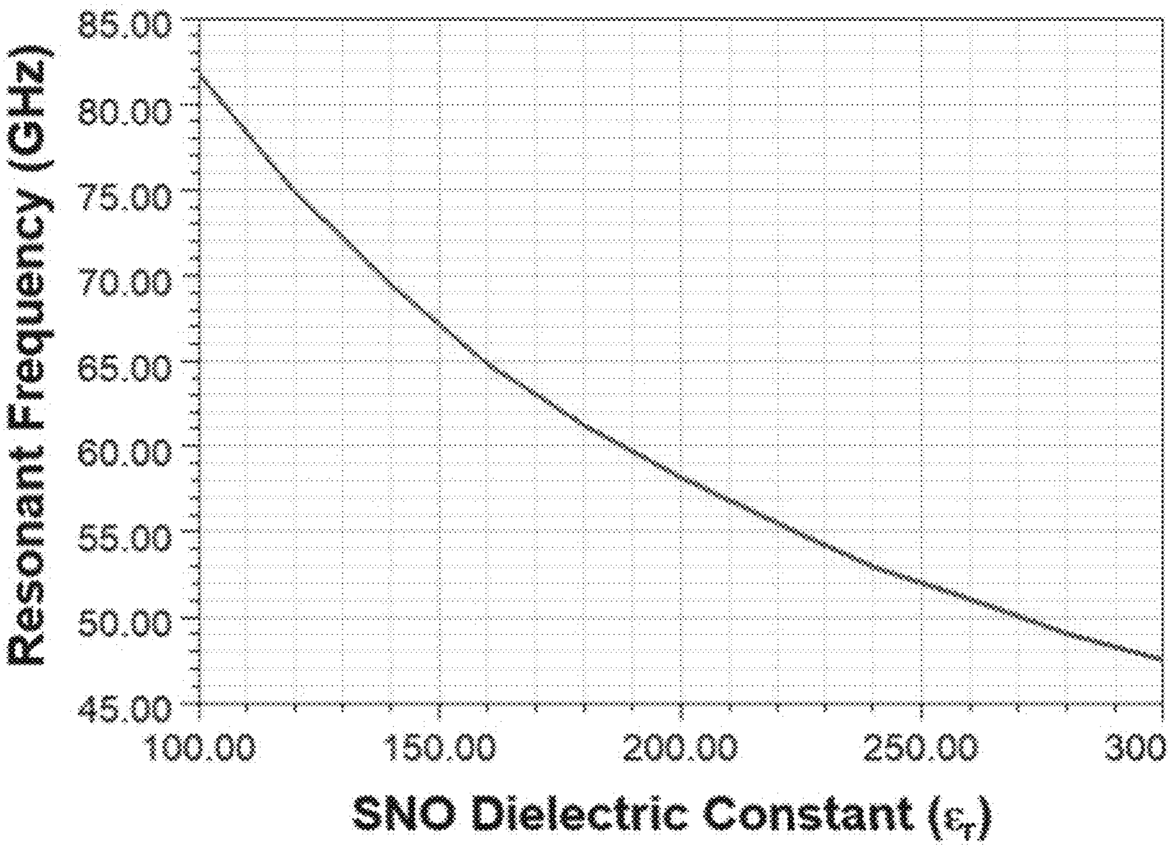
FIG. 6 is a graphical depiction of the resonant frequency versus the dielectric constant of the tunable resonator depicted in FIG. 5.

Depicted in FIG. 6 is a plot of the center frequency versus dielectric constant for an example tunable SNO resonator 150. As the dielectric constant of resonator 150 increases, the center resonant frequency of resonator 150 decreases. As examples, an 81.8 GHz resonant frequency is achieved with a dielectric constant of 100, a 50 GHz resonant frequency is achieved with a dielectric constant of 270, and a 47.5 GHz resonant frequency is achieved with a dielectric constant of 300.

Figure 7:
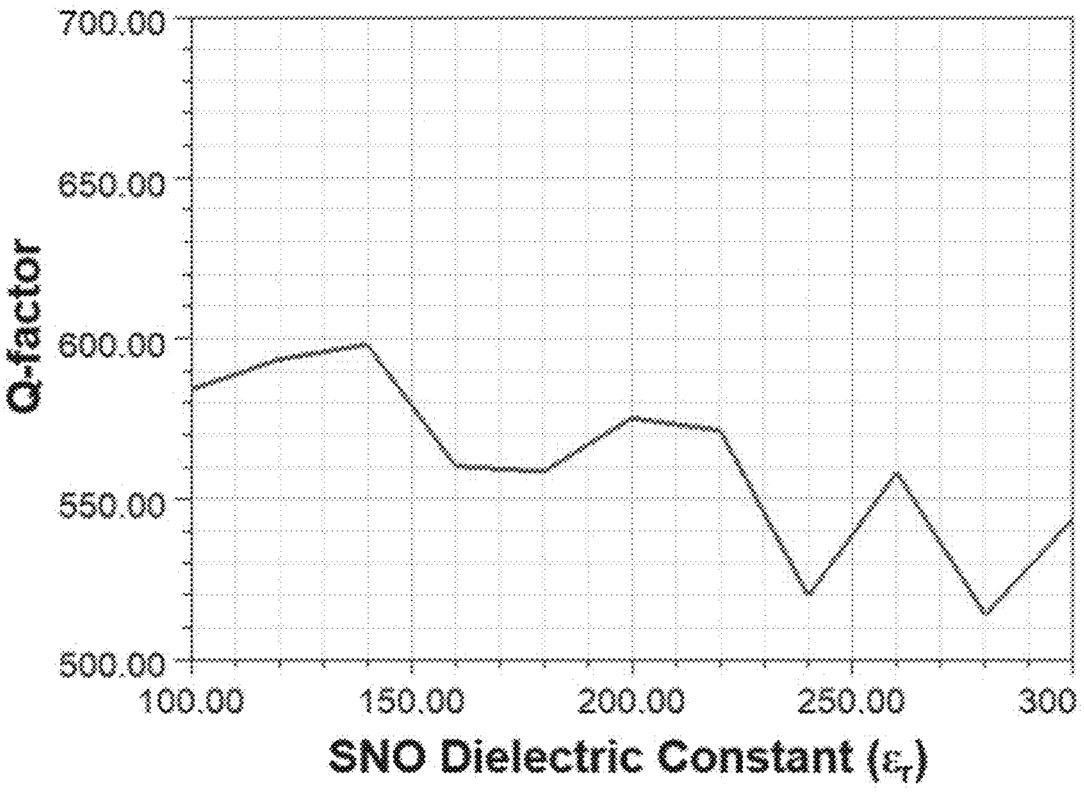
FIG. 7 is a graphical depiction of the Q-factor versus the dielectric constant of the tunable resonator depicted in FIG. 5.

FIG. 7 depicts Q-factor versus dielectric constant for an example tunable SNO resonator 150. Higher Q-factors correlate to lower loss (in other words, less damping), which can be advantageous for resonating members. The Q-factor of the example tunable SNO resonator 150 is greater than 500 over the entire dielectric constant range (in other words, the 3:1 dielectric constant tuning range) of $100 \le \varepsilon_r \le 300$. The maximum Q-factor that can typically be obtained utilizing embodiments of the present disclosure is 1000, which is generally considered to be quite high. Features that reduce the Q-factor include conductor losses from the electrodes and RF energy leakage (such as leakage to the air).

The size of resonators and resonating members according to embodiments of the present disclosure can be dramatically reduced by using higher dielectric constant material such as SNO.

When implementing the rare-earth nickelate resonators and resonating members in larger systems (for example, transmitters, filters and/or antennae), the resonators and resonating members must be connected to the circuitry of the larger systems. To facilitate connection of the rare-earth resonating members to the additional circuitry, the resonating members may be mounted to implementation devices with substrates with electrical lines/traces that facilitate connection of the resonating member to the additional circuitry. Efficient energy coupling through optimum excitation schemes is important when connecting the resonators and resonating members to the larger systems. Avoidance of poor excitation configurations (those that result in high losses and inefficient operation) is important. FIGS. 8-11 disclose example implementation device configurations that may be useful in connecting the rare-earth resonating members to the additional circuitry in the larger systems in which the resonating members are implemented, for example, transmitters, filters and/or antennae.

Figure 8A:
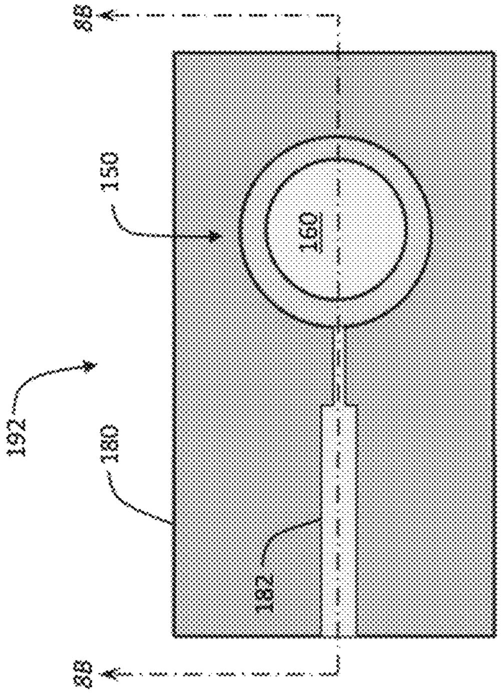
FIG. 8A is a top plan view of a resonating member mounted to an implementation device according to embodiments of the present disclosure.
Figure 8B:
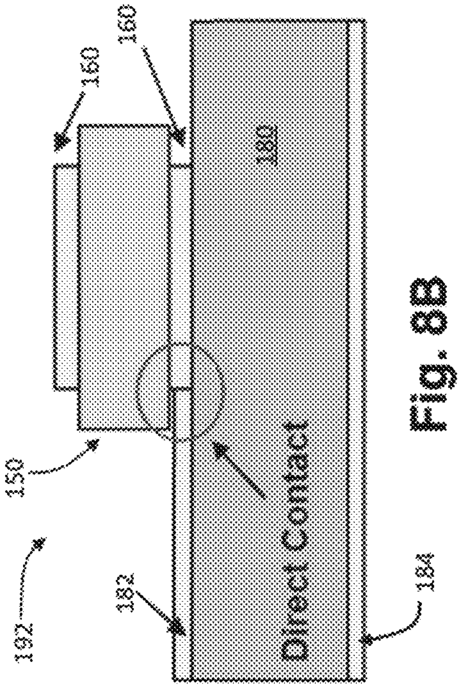
FIG. 8B is a sectional view of the resonating member and implementation device depicted in FIG. 8A taken along line 8B-8B.

Depicted in FIGS. 8A and 8B is an example of a rare-earth nickelate resonator (for example, a resonator 150) operationally mounted to an implementation device 192 according to at least one embodiment of the present disclosure. Mounting the resonator 150 to substrate 180 as shown and described enables use of the resonator 150 in different systems, such as transmitters, filters and antennae. A first conductive trace (or line) 182 (which may also be referred to as an electrical trace) is formed on a first side of substrate 180. An optional second conductive trace (or line) 184 may be formed on a second side of substrate 180, which can also be used as a common ground. Copper (Cu) and gold (Au) are example materials used to form the conductive traces 182 and 184. The resonator 150 is mounted to the first side of substrate 180. The overall thickness of the resonator implementation device 192 is significantly less than known resonator implementation devices, and in at least some embodiments the maximum thickness is 200 microns (0.2 mm), while in additional embodiments the overall thickness is at most 100 microns (0.1 mm). In the embodiments depicted in FIGS. 8A and 8B the first conductive trace 182 and the resonator 150 are configured with the first conductive trace being in direct physical contact with the electrode 160 that is adjacent the first side of substrate 180 (the lower electrode 160). When installed in the larger system (for example, a transmitter, filter or antenna), the upper electrode 160 will be electrically connected to the larger system. In use, an electric potential is applied between conductive trace 182 and the electrical connection for the upper electrode 160. The direct contact (inductive coupling) between the electrode 160 that is adjacent the first side of substrate 180 (the lower electrode 160) and the direct electrical connection between the larger system and the upper electrode 160 result in the formation of an electric field between the two electrodes 160. By varying the voltage potential applied between the two electrodes 160, the electric potential (and the electric field) applied to the rare-earth nickelate of resonator 150 is varied, and the resonant frequency of resonator 150 is changed.

Figure 9A:
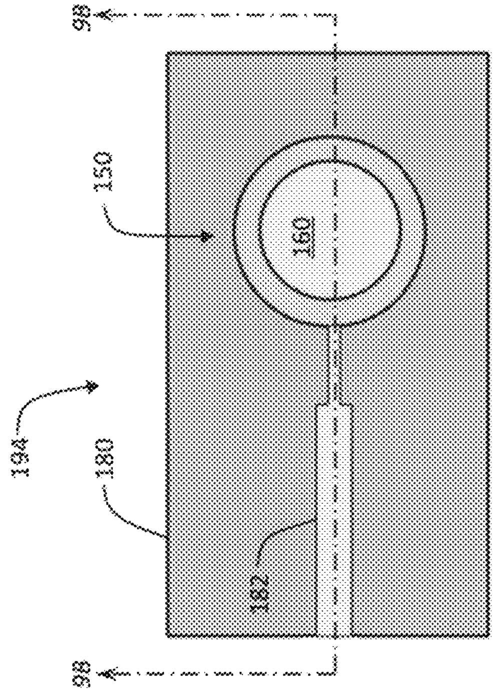
FIG. 9A is a top plan view of a resonating member mounted to an implementation device according to additional embodiments of the present disclosure.
Figure 9B:
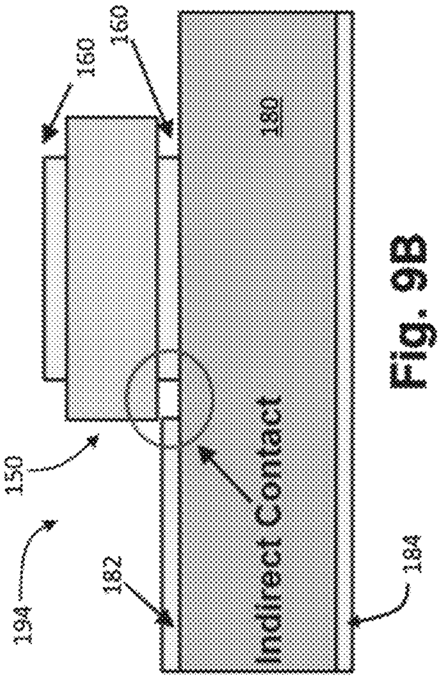
FIG. 9B is a sectional view of the resonating member and implementation device depicted in FIG. 9A taken along line 9B-9B.

Depicted in FIGS. 9A and 9B is an example rare-earth nickelate resonator (for example, a resonator 150) operationally mounted to an implementation device 194 according to another embodiment of the present disclosure. Mounting the resonator 150 to substrate 180 as shown and described enables use of the resonator 150 in different systems, such as transmitters, filters and antennae. A first conductive trace 182 is formed on a first side of substrate 180. An optional second conductive trace 184 may be formed on a second side of substrate 180, which can also be used as a common ground. The resonator 150 is mounted to the first side of substrate 180. The overall thickness of the resonator implementation device 194 depicted in FIGS. 9A and 9B is similar to, and in some embodiments the same as, the overall thickness of the resonator implementation device 192 depicted in FIGS. 8A and 8B. In this embodiment the first conductive trace 182 and the resonator 150 are configured and arranged to form a gap between the first conductive trace 182 and the electrode 160 that is adjacent the first side of substrate 180 (the lower electrode 160). When installed in the larger system (for example, a transmitter, filter or antenna), the upper electrode 160 will be electrically connected to the larger system. In use, an electric potential is applied between conductive trace 182 and the electrical connection for the upper electrode 160. The indirect contact (which results in capacitive coupling) between conductive trace 182 and the electrode 160 that is adjacent the first side of substrate 180 (the lower electrode 160) and the direct electrical connection between the larger system and the upper electrode 160 result in the formation of an electric field between the two electrodes 160. For capacitive coupling to be effective, the size of the gap between the first conductive trace 182 and electrode 160 will depend on the frequency and the filter types, and in at least some embodiments that gap will be less than or equal to 30% of the diameter of electrode 160. By varying the voltage potential applied between the two electrodes 160, the electric potential (and the electric field) applied to the rare-earth nickelate of resonator 150 is varied, and the resonant frequency of resonator 150 is changed.

Figure 10A:
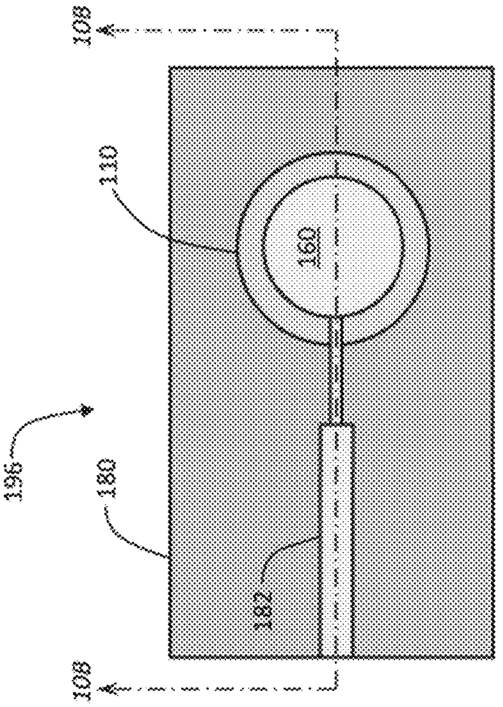
FIG. 10A is a top plan view of a resonating member mounted to an implementation device according to further embodiments of the present disclosure.
Figure 10B:
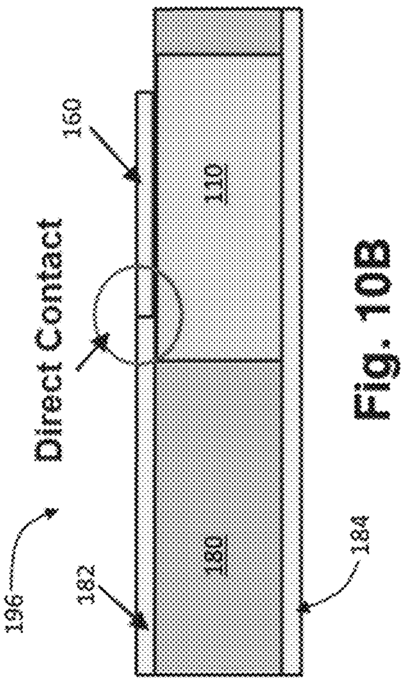
FIG. 10B is a sectional view of the resonating member and implementation device depicted in FIG. 10A taken along line 10B-10B.

Depicted in FIGS. 10A and 10B is an example rare-earth nickelate resonating member (for example, a resonating member 110) operationally embedded into an implementation device 196 according to one embodiment of the present disclosure. Mounting the resonating member 110 to substrate 180 as shown and described enables use of the resonating member 110 in different systems, such as transmitters, filters and antennae. A first conductive trace 182 is formed on a first side of substrate 180 and a second conductive trace 184 is formed on a second side of substrate 180. Copper (Cu) and gold (Au) are example materials used to form the conductive traces 182 and 184. In some embodiments, the resonating member 110 is mounted with its top and bottom surfaces contacting conductive traces 182 and 184, thereby removing the need for electrodes 160. In still further embodiments, the top and bottom surfaces of resonating member 110 are coplanar with the top and bottom surfaces of substrate 180. At least one advantage of this mounting configuration is that the overall thickness of the resonator implementation 196 device is significantly reduced, and in some embodiments the overall thickness is at most 100 microns (0.10 mm), while in additional embodiments the overall thickness is at most 75 microns (0.075 mm).

The first conductive trace 182 and the resonating member 110 are configured with the first conductive trace 182 being in direct physical contact with the electrode 160 that is adjacent the first side of substrate 180 (the upper electrode 160). In use, an electric potential is applied between conductive trace 182 and conductive trace 184 which, in turn, applies an electric potential between the two electrodes 160. In this embodiment there is inductive coupling of conductive trace 182 and electrode 160 due to the physical contact between conductive trace 182 and electrode 160. By varying the voltage potential between conductive trace 182 and conductive trace 184, the electric potential (and the electric field) applied between the two electrodes 160 and, therefore, to the rare-earth nickelate of resonating member 110 may be varied, changing the dielectric constant and the resonant frequency of resonating member 110.

Figure 11A:
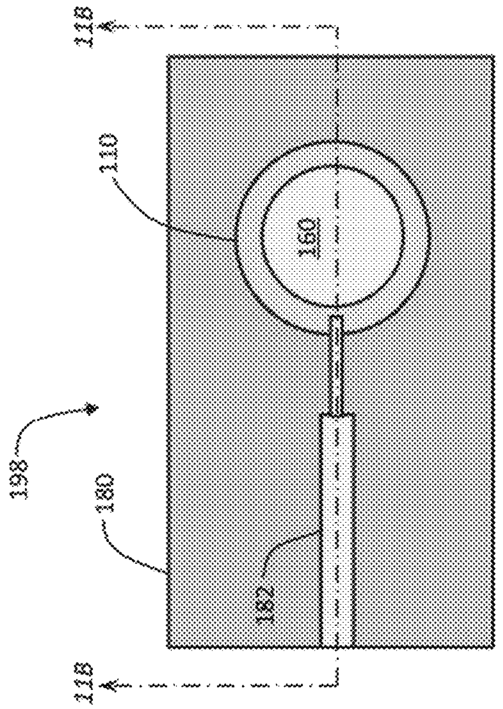
FIG. 11A is a top plan view of a resonating member mounted to an implementation device according to still additional embodiments of the present disclosure.
Figure 11B:
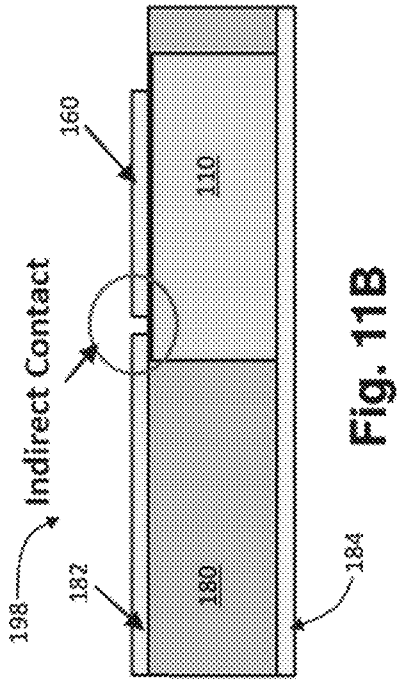
FIG. 11B is a sectional view of the resonating member and implementation device depicted in FIG. 11A taken along line 11B-11B.

Depicted in FIGS. 11A and 11B is an example rare-earth nickelate resonating member (for example, a resonating member 110) operationally embedded into an implementation device 198 according to another embodiment of the present disclosure. Mounting the resonating member 110 to substrate 180 as shown and described enables use of the resonating member 110 in different systems, such as transmitters, filters and antennae. A first conductive trace 182 is formed on a first side of substrate 180 and a second conductive trace 184 is formed on a second side of substrate 180. In some embodiments, the resonating member 110 is mounted with its top and bottom surfaces contacting conductive traces 182 and 184, thereby removing the need for electrodes 160. In still further embodiments, the top and bottom surfaces of resonating member 110 are coplanar with the top and bottom surfaces of substrate 180. At least one advantage of this mounting configuration is that the overall thickness of the resonator implementation device 198 is significantly reduced, and in at least some embodiments is at most 100 microns (0.10 mm), while in additional embodiments the overall thickness is at most 75 microns (0.075 mm). In this embodiment the first conductive trace 182 and the electrode 160 adjacent conductive trace 182 are configured to form a gap between the first conductive trace 182 and the adjacent electrode 160. For capacitive coupling to be effective, the size of the gap between the first conductive trace 182 and electrode 160 will depend on the frequency and the filter types, and in at least some embodiments the gap will be less than or equal to 30% of the diameter of electrode 160. In use, an electric potential is applied between conductive trace 182 and conductive trace 184 which, in turn, applies an electric potential between the two electrodes 160. In this embodiment there is capacitive coupling between conductive trace 182 and electrode 160 adjacent conductive trace 182 (the upper electrode 160). By varying the voltage potential between conductive trace 182 and conductive trace 184, the electric potential (and the electric field) applied between the two electrodes 160 and, therefore, to the rare-earth nickelate of resonating member 110 may be varied, changing the dielectric constant and the resonant frequency of the resonating member 110.

Embodiments of the present disclosure include one or more conductive traces that form the electrodes to which the conductive traces connect. Using the embodiments represented by FIGS. 8A and 8B as an example, the conductive trace 182 can form the bottom electrode 160. Stated differently, the conductive trace 182 and the bottom electrode 160 may be formed together so that the boundary of where one ends and the other begins is difficult, if not impossible, to determine. In some embodiments, one or more electrodes form the conductive traces. In view of the above, it should be understood that conductive traces and electrodes may be (although not necessarily) comprised of the same material/materials.

Substrate 180 may be a printed circuit board (PCB), which in some embodiments may include silicon (Si) and/or silicon carbide (SiC).

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

To clarify the use of and to hereby provide notice to the public, the phrases "at least one of A, B, . . . and N" or "at least one of A, B, . . . . N, or combinations thereof" or "A, B, . . . and/or N" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. As one example, "A, B and/or C" indicates that all of the following are contemplated: "A alone," "B alone," "C alone," "A and B together," "A and C together," "B and C together," and "A, B and C together." If the order of the items matters, then the term "and/or" combines items that can be taken separately or together in any order. For example, "A, B and/or C" indicates that all of the following are contemplated: "A alone," "B alone," "C alone," "A and B together," "B and A together," "A and C together," "C and A together," "B and C together," "C and B together," "A, B and C together," "A, C and B together," "B, A and C together," "B, C and A together," "C, A and B together," and "C, B and A together."

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

ELEMENT NUMBERING

Table 2 includes element numbers and at least one word used to describe the element and/or feature represented by the element number. However, none of the embodiments disclosed herein are limited to these descriptions. Other words may be used in the description or claims to describe a similar member and/or feature, and these element numbers can be described by other words that would be understood by a person of ordinary skill reading and reviewing this disclosure in its entirety.

TABLE 2

| | |
|---|---|
| 110 | resonating member |
| 112 | height |
| 114 | diameter |
| 116 | axis |
| 118 | perimeter surface |
| 120 | electric field |
| 122 | direction |
| 130 | electrical circuit |
| 132 | capacitor |
| 134 | resistor |
| 136 | inductor |
| 140 | electric field |
| 142 | lower voltage |
| 144 | higher voltage |
| 150 | resonator |
| 152 | height |
| 154 | diameter |
| 160 | electrode |
| 170 | electrical circuit |
| 172 | variable capacitor |
| 174 | resistor |
| 176 | inductor |
| 180 | substrate |
| 182 | conductive trace |
| 184 | conductive trace |
| 192 | implementation device |
| 194 | implementation device |
| 196 | implementation device |
| 198 | implementation device |

What is claimed is:

1. A tunable millimeter wave resonator, comprising:

a resonating member consisting essentially of a rare-earth nickelate and defining a first side and a second side;

a first electrode contacting the first side of the resonating member; and a second electrode contacting the second side of the resonating member;

wherein a resonant frequency of the resonating member is changed when an electrical potential between the first and second electrodes is changed;

the resonator further comprising:

a substrate defining a first side and a second side;

a first electrical trace on the first side of the substrate; and a second electrical trace on the second side of the substrate;

wherein the first electrical trace is in electrical communication with the first electrode; and wherein the second electrical trace forms the second electrode contacting the second side of the resonating member.

2. The tunable millimeter wave resonator of claim 1, wherein the rare-earth nickelate is samarium nickelate (SmNiO3).

3. The tunable millimeter wave resonator of claim 1, wherein:

a loss tangent (tan δ) of the rare-earth nickelate is less than 0.001;

a dielectric constant ($\varepsilon_r$) of the rare-earth nickelate is at least 200; and a quality (Q) factor of the rare-earth nickelate is greater than 500.

4. The tunable millimeter wave resonator of claim 1, wherein the first electrical trace physically contacts the first electrode.

5. The tunable millimeter wave resonator of claim 1, wherein the first electrical trace and the first electrode are configured to define a gap between the first electrical trace and the first electrode.

6. The tunable millimeter wave resonator of claim 1, wherein an overall thickness of the resonating member, the first electrode, the second electrode, the substrate, the first electrical trace and the second electrical trace when connected together is at most 0.2 millimeters.

7. The tunable millimeter wave resonator of claim 1, wherein a diameter of the resonating member is at most 1 millimeter.

8. The tunable millimeter wave resonator of claim 1, wherein varying the electrical potential between the first and second electrodes varies the resonant frequency between 30 GHz and 100 GHz inclusive.

9. The tunable millimeter wave resonator of claim 1, wherein:
the resonating member is embedded in the substrate, wherein
the first side of the resonating member is coplanar with the first side of the substrate, and
the second side of the resonating member is coplanar with the second side of the substrate.

10. The tunable millimeter wave resonator of claim 9, wherein the first electrical trace physically contacts the first electrode.

11. The tunable millimeter wave resonator of claim 9, wherein the first electrical trace and the first electrode are configured to define a gap between the first electrical trace and the first electrode.

12. The tunable millimeter wave resonator of claim 9, wherein an overall thickness of the resonating member, the first electrode, the second electrode, the substrate, the first electrical trace and the second electrical trace when connected together is at most 0.1 millimeters.

13. A transmitter, filter or antenna including the tunable millimeter wave resonator of claim 1.

14. A tunable millimeter wave resonator, comprising:
a resonating member consisting essentially of a rare-earth nickelate and defining a first side and a second side;
a first electrode contacting the first side of the resonating member; and
a second electrode contacting the second side of the resonating member;
wherein a resonant frequency of the resonating member is changed when an electrical potential between the first and second electrodes is changed;
thetunable millimeter wave resonator of claim 1, further comprising:
a substrate defining a first side and a second side;
a first electrical trace on the first side of the substrate; wherein
the first electrical trace is in electrical communication with the first electrode,
an overall thickness of the resonating member, the first electrode, the second electrode, the substrate and the first electrical trace when connected together is at most 0.2 millimeters,
a diameter of the resonating member is at most 1 millimeter, varying the electrical potential between the first and second electrodes varies the resonant frequency between 45 GHZ and 80 GHZ,
a loss tangent (tan $\delta$) of the rare-earth nickelate is less than 0.001,
a dielectric constant ($\varepsilon_r$) of the rare-earth nickelate is at least 200, and
a quality (Q) factor of the rare-earth nickelate is greater than 500.

15. A method of operating a tunable millimeter wave resonator, comprising:
applying a voltage across first and second sides of a resonating member consisting essentially of a rare-earth nickelate;
generating a first resonance frequency of at least 30 GHz with the resonating member by said applying a voltage;
varying the voltage applied across the first and second sides of the resonating member; and
varying the first resonance frequency of the resonating member to a second resonance frequency of at least 30 GHz by said varying the voltage, wherein the second resonance frequency is different from the first resonance frequency;
wherein:
a first electrode is connected to the first side of the resonating member and a second electrode is connected to the second side of the resonating member; and
said applying a voltage includes
electrically communicating a voltage between the first electrode and the second electrode, and
said electrically communicating uses a capacitive coupling for electrically communicating with the first electrode and an inductive coupling for electrically communicating with the second electrode.

16. The method of claim 15, wherein the rare-earth nickelate is samarium nickelate (SmNiO3).

17. The method of claim 16, wherein the first resonance frequency is at most 80 GHz and the second resonance frequency is at most 80 GHz.

18. A millimeter wave resonator, comprising:
a substrate defining a first side and a second side;
a resonating member consisting essentially of a rare-earth nickelate and defining a first side and a second side, wherein the first side of the resonating member is coplanar with the first side of the substrate, and wherein the second side of the resonating member is coplanar with the second side of the substrate;
a first electrically conductive material mounted to the first side of the substrate and the first side of the resonating member; and
a second electrically conductive material mounted to the second side of the substrate and the second side of the resonating member; wherein a resonant frequency of the resonating member is changed when an electrical potential between the first electrically conductive material and the second electrically conductive material changed.

* * * * *